Patented Oct. 5, 1948

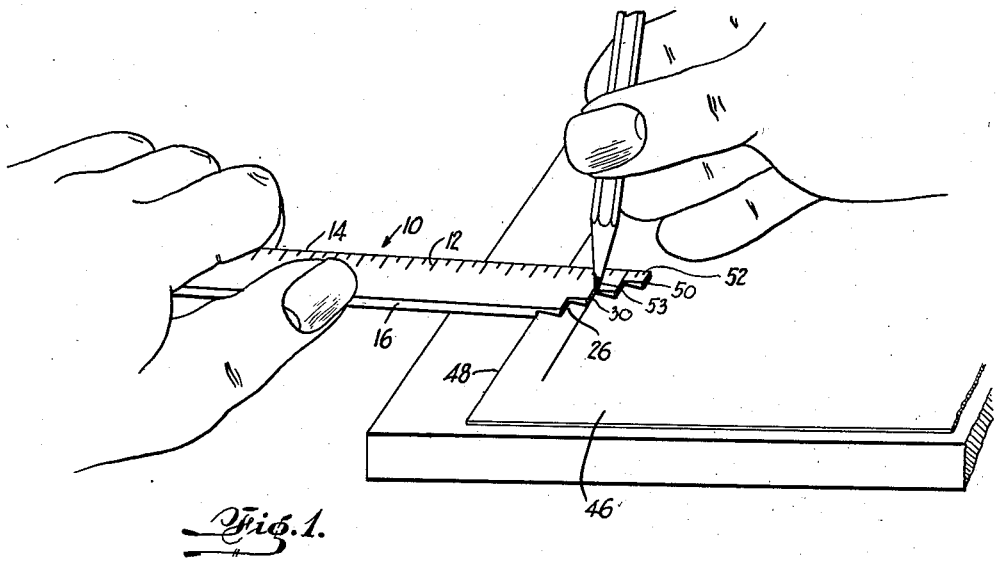
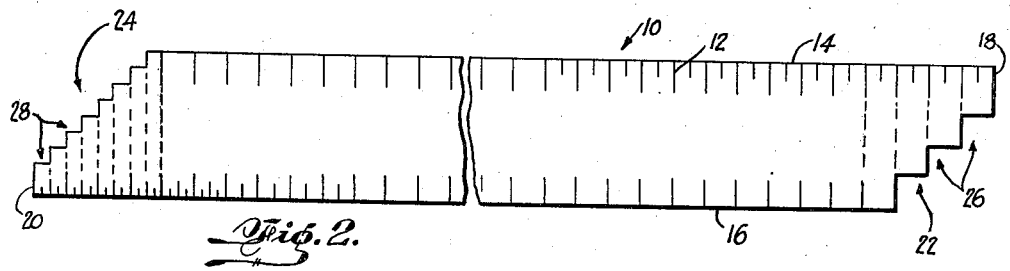
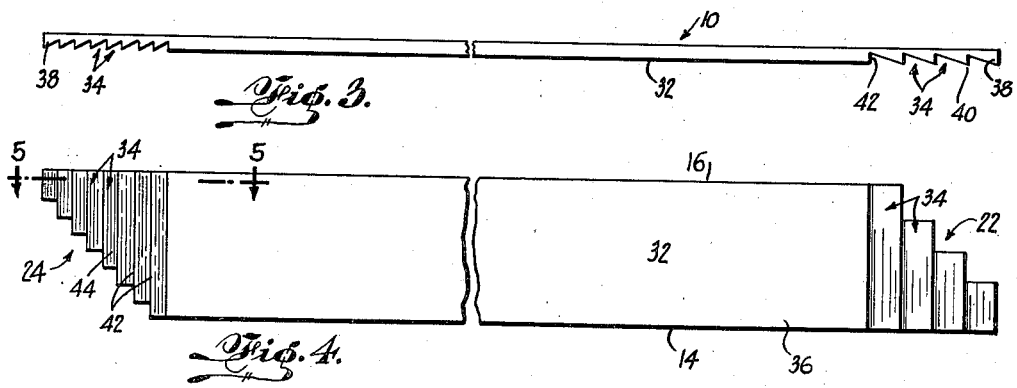

2,450,769

UNITED STATES PATENT OFFICE 2,450,769

PATTERN GRADING RULER

Benjamin Rothblum, New York, N. Y.

Application January 17, 1944, Serial No. 518,554

7 Claims. (Cl. 33—42)

This invention relates to a pattern grading ruler.

The use of a master pattern for making patterns for garments of different sizes is well-known. It is also known that the artisan usually manipulates a straight edge of some kind, holding the straight edge in place with his fingernail, and then grading the pattern to obtain the properly proportioned contours in accordance with the variation desired upon the master pattern. In some cases, the worker depends upon sight in order to ascertain the different gradations in the new pattern to be produced, that is, he has to look at the different units of measurement with which the scale may be graduated, in order to select the correct one.

It is an object of the invention to provide means for eliminating, to as great a degree as possible, the necessity for inspecting the scale at each manipulation, and to remove the effect of inaccuracies arising from the manner in which the artisan uses his grading ruler.

The edge of the master pattern is the important beginning point from which measurements for producing the other patterns are to be taken. It is an object of the invention to provide means to co-operate with the edge of such master patterns so that such means may efficiently and swiftly produce a required gradation of a pattern.

It is an object of the invention to make possible that an artisan may, with facility, produce a graded pattern merely by engaging a predetermined portion of a ruler with the edge of the master pattern, and then sliding the ruler along the edge of the pattern for making the required markings or line.

Other objects of this invention will be set forth hereinafter, or will be apparent from the description and the drawings, in which is illustrated an emodiment of a ruler for carrying out the invention.

The invention, however, is not intended to be restricted to any particular contruction, or to any particular arrangement of parts, or to any particular application of any such construction, or any such arrangement of parts, or to any specific method of operation, or to any of the various details thereof, even where specifically shown and described herein, as the same may be modified in various particulars, or may be applied in many varied relations, without departing from the spirit and scope of the claimed invention, a practical construction embodying certain details of the invention being illustrated and described, but only for the purpose of complying with the requirements of the statutes for disclosure of an operative embodiment, and without attempting to disclose all of the various forms and modifications in which the invention might be embodied.

On the drawings, in which the same reference characters refer to the same parts throughout, and in which is disclosed such a practical construction:

Fig. 1 is a perspective view, illustrating a pattern and device embodying features of the invention, positioned relatively to each other for proper manipulation and use;

Fig. 2 is a plan view of the device embodying features of the invention;

Fig. 3 is an edge elevational view of the device shown in Fig. 2;

Fig. 4 is a bottom plan view of the device of Fig. 2; and

Fig. 5 is a longitudinal cross-sectional view, substantially on the line 5—5 of Fig. 4, to an enlarged scale.

Ruler 10, shown on the drawings, may have the usual indicia 12 graduated along one or more of its edges 14 and 16, in accordance with ordinary scales for measurement. Thus, the ruler may be used for ordinary measuring functions. For instance, between points 18 and 20, the ruler may be divided into inches, quarter-inches, or like divisions.

Ends 22 and 24 of the ruler may be cut away, or otherwise formed, to provide a series of steps. At end 22, steps 26 are formed. At end 24, steps 28 are formed. The steps may be of any desired dimension. For instance, steps 26 may each be a quarter of an inch in length.

Thus, it is a simple matter for the artisan, merely by the touch of his finger against these steps, to determine how many quarter inches there are up to a particular ledge 30 which the artisan may desire to use at that time for grading. If he desires to use his fingernail in the usual manner, it would be unnecessary that he read the ruler, since the click of his nail over the required number of steps would announce to him that he had reached the desired position. Furthermore, as a matter of visibility, the stepped formation itself would facilitate reading off the necessary units of measurement for proper use of the ruler.

In the same manner, steps 28 may each be of the dimension of an eighth of an inch, and may be used in a manner similar to that described for steps 26.

In order further to facilitate the use of the ruler, and effectively to provide for its cooperation with a master pattern to be graded, face 32 of ruler 10 may be formed or otherwise provided with depressions or undercuttings 34. These undercuttings are positioned in definite relation to steps 26 and 28 so that each step cut away from body 36 of the ruler in a direction transversely of edges 14 and 16 will be associated with a depression 34 in face 32. The depression preferably extends all the way across the ruler, that is, from edge 14 to edge 16 or to the edge of the associated step.

Depressions 34 preferably are formed to dispose a series of ridges 38, the peaks 40 of which are substantially in the plane of face 32. Each ridge thus is formed by a wall or face 42 which extends substantially perpendicularly to face 32. Then a face 44 extends from the bottom of the depression to the peak of the next ridge. Thus, even by a shallow depression, the sharpness of the drop at face 42 provided means so that, when face 32 is pressed against pattern 46, and the fingers of the artisan ride the ruler, and, when a peak 40 passes edge 48 of the pattern, the artisan will feel a click. Then he can push the ruler so that face 42 will be engaged solidly against edge 48. Of course, he would have clicked off as many quarters or eighths of an inch as he desired, in order properly to grade the pattern. Then he could proceed to make the required marks at the dimension determined by free face 50 of the extreme end 52 of the ruler. However, as shown, the artisan may lock his pencil in proper position by engaging point 53 in the corner formed by a step. In such case, it would be a simple matter for the artisan properly to count the grading fractions to determine the proper position, since the fractions would be made visible by the stepped formation of the ruler end.

Once the ruler is thus engaged against edge 48, the artisan need merely slide the ruler, with face 42 and edge 48 thus engaged, from position to position around the edge of the pattern, making such marks at the different stations as he may feel are required for his purposes. The thickness of the pattern will remain substantially seated within the particular depression and against the particular face against which edge 48 had become engaged, and will serve to lock the ruler properly in position for this operation. In the meantime, body portion 36 of the ruler provides a handle for manipulating the ruler during this operation of grading the pattern.

Many other changes could be effected in the particular device designed, and in the method of operation set forth, and in specific details thereof, without substantially departing from the invention defined in the claims, the specific description being merely of an operative embodiment capable of illustrating certain principles of the invention.

What is claimed as new and useful is:

1. A grading ruler comprising a substantially straight-edged member, one of the edges being graduated in units of a system of measurement, the member at one end having a plurality of equal steps, each of the steps including an indentation in the face of the member, the steps serving to taper the member at that end from substantially the entire width of the straight edge to a point, the point being substantially the width of one step and constituting the first step, the graduations on the member following seriatim along the straight edge away from the steps.

2. A grading ruler comprising a substantially straight-edged, flat-faced member, the member being graduated along one of its faces in units of a system of measurement, the member at one end being indented at a plurality of different positions along one of its faces to provide edge engaging surfaces, the indentations being positioned at equal intervals equivalent to the extent of one of the units of measurement, and the graduations of the member then following seriatim along the member and away from the location of the indentations.

3. A grading ruler comprising a substantially straight-edged, flat-faced member, the member being graduated in units of a system of measurement, the member at one end being provided with a plurality of ridges, the peaks of the ridges being positioned at equal intervals equivalent to the extent of one of the units of measurement, and the graduations of the member then following seriatim along the member and away from the location of the ridges.

4. A grading ruler comprising a substantially straight-edged, flat-faced member, the member being graduated in units of a system of measurement, the member at one end being provided with a plurality of ridges, the peaks of the ridges being positioned at equal intervals equivalent to the extent of one of the units of measurement, and the graduations of the member then following seriatim along the member and away from the location of the ridges, the peaks of the ridges being substantially in the plane of one of the faces.

5. A grading ruler comprising a substantially straight-edged, flat-faced member, the member being graduated along one of its faces in units of a system of measurement, the member at one end being indented at a plurality of different positions, each of the indentations having an accompanying ridge so that the ridges are spaced at the same intervals as the indentations, the indentations being positioned to form a plurality of steps at equal intervals each equivalent to the extent of one of the units of measurement, and the graduations of the member then following seriatim along the flat face and away from the location of the indentations and the ridges.

6. A grading ruler comprising a substantially straight-edged, flat-faced member, the member being graduated along one of its faces in units of a system of measurement, the member at one end being indented at a plurality of different positions, each of the indentations having an accompanying ridge so that the ridges are spaced at the same intervals as the indentations, the indentations being positioned to form a plurality of steps at equal intervals each equivalent to the extent of one of the units of measurement, and the graduations of the member then following seriatim along the flat face and away from the location of the indentations and the ridges, the peaks of the ridges being substantially in the plane of one of the faces.

7. A grading ruler comprising a substantially straight-edged, flat-faced member, the member being graduated along one of its faces in units of a system of measurement, the member at one end being indented at a plurality of different positions, each of the indentations having an accompanying ridge so that the ridges are spaced at the same intervals as the indentations, the indentations being positioned to form a plurality of steps at equal intervals each equivalent to the extent of one of the units of measurement, and the graduations of the member then following seriatim along the flat face and away from the location of the indentations and the ridges, the peaks of the ridges being substantially in the plane of one of the faces and each of the ridges being in line with the top edge of a step.

BENJAMIN ROTHBLUM.

REFERENCES CITED

The following references are of record in the file of this patent:

UNITED STATES PATENTS

| Number | Name | Date |
|---|---|---|
| 848,399 | Rowell | Mar. 26, 1907 |

FOREIGN PATENTS

| Number | Country | Date |
|---|---|---|
| 84,466 | Switzerland | July 3, 1919 |